United States Patent
Feng et al.

(10) Patent No.: US 10,205,730 B2
(45) Date of Patent: Feb. 12, 2019

(54) ACCESS CONTROL FOR DATABASE

(71) Applicant: International Business Machines Corporation, Armonk, NY (US)

(72) Inventors: Hao Feng, Beijing (CN); Shuo Li, Beijing (CN); Shengyan Sun, Beijing (CN); Xin Ying Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 14/869,010

(22) Filed: Sep. 29, 2015

(65) Prior Publication Data

US 2017/0093876 A1    Mar. 30, 2017

(51) Int. Cl.
*G06F 7/00* (2006.01)
*G06F 17/30* (2006.01)
*H04L 29/06* (2006.01)

(52) U.S. Cl.
CPC ...... *H04L 63/104* (2013.01); *G06F 17/30289* (2013.01)

(58) Field of Classification Search
CPC ......... G06F 17/30289; G06F 17/30867; H04L 63/104
USPC ....................................................... 707/754
See application file for complete search history.

(56) References Cited

U.S. PATENT DOCUMENTS

| | | | |
|---|---|---|---|
| 7,266,566 B1* | 9/2007 | Kennaley | G06F 17/30557 |
| 7,661,141 B2 | 2/2010 | Dutta et al. | |
| 7,711,750 B1 | 5/2010 | Dutta et al. | |
| 8,027,993 B2 | 9/2011 | Holmes et al. | |
| 8,166,071 B1* | 4/2012 | Korablev | G06F 21/6218 707/783 |
| 8,478,713 B2 | 7/2013 | Cotner et al. | |
| 9,531,698 B1 | 12/2016 | Ahn | |
| 9,736,140 B1 | 8/2017 | Wu et al. | |
| 2008/0033955 A1* | 2/2008 | Fujii | G06F 21/6218 |
| 2010/0262625 A1* | 10/2010 | Pittenger | G06F 17/30525 707/783 |
| 2011/0150224 A1* | 6/2011 | Noh | H04L 9/0836 380/277 |
| 2011/0265188 A1* | 10/2011 | Ramaswamy | G06F 21/604 726/28 |
| 2013/0138666 A1 | 5/2013 | Muller et al. | |
| 2014/0223444 A1* | 8/2014 | Keeton | G06F 9/5011 718/104 |
| 2016/0057474 A1 | 2/2016 | Mitchell et al. | |

OTHER PUBLICATIONS

Botz, "Cool New "Row Column Access Control" Makes Compliance Easier," Botz Security Bytes Information Security Blog, May 11, 2014, p. 1-6, Botz and Associates, http://www.botzandassociates.com/blog/cool-new-row-column-access-control-makes-compliance-easier/, Accessed on Apr. 23, 2015.

* cited by examiner

*Primary Examiner* — Binh V Ho
(74) *Attorney, Agent, or Firm* — Patricia B. Feighan

(57) ABSTRACT

In an embodiment of the present invention, a command for performing a database operation with respect to a table of a database is received, whereby the table has a visible key column for identification information and one or more invisible token columns for token information. The user's role from the command is obtained. A record is identified in the table based on a combination of the identification information and the token information corresponding to the user's role. The database operation is performed on the identified record.

17 Claims, 6 Drawing Sheets

| Policy_ID | Coverage | Life_start | Life_end | Authorization |
|---|---|---|---|---|
| | | | | |
| | | | | |

Figure 2

ACCESS CONTROL FOR DATABASE

BACKGROUND

The present invention relates to database technology, and more specifically, to access control for a database.

Database Management System (DBMS) is widely used to manipulate and manage databases. Users can access data stored in a database through the DBMS. The DBMS enables an application or a user to setup, query, or modify the data in the database. The DBMS can provide Data Definition Language (DDL) and Data Manipulation Language (DML) for the user to define the database and implement data insertion, data deletion, data update, and data selection.

The database can organize and store data in the form of a table, which is also referred to as "table". Generally, a row of the table represents a record of data, and a column of the table represents information or attribute of the table. The record usually has a primary key as identification information for identifying the record uniquely, and can be accessed via the primary key.

Database security is very important in the management of database, especially the security of data in the database. Access control is a kind of approach for protecting the data stored in the database from being accessed by an unauthorized user or application.

One conventional access control technique is column mask. In the column mask technique, some columns of the table can be covered, and thus the user or application cannot access these columns if the user or application is not authorized. Another conventional access control technique is row permission. In the row permission technique, some rows can be covered, and thus the user or application cannot access these rows if the user or application is not authorized.

SUMMARY

According to an embodiment of the present invention, there is provided a computer-implemented method. In the method, a command for performing a database operation with respect to a table of a database is received, wherein the table has a visible key column for identification information and one or more invisible token columns for token information. The user's role from the command is obtained. A record is identified in the table based on a combination of the identification information and the token information corresponding to the user's role. The database operation is performed on the identified record.

According to another embodiment of the present invention, there is provided a system. The system comprises one or more processors, a memory coupled to at least one of the processors, a set of computer program instructions stored in the memory and executed by at least one of the processors in order to perform actions of: receiving a command for performing a database operation with respect to a table of a database, wherein the table has a visible key column for identification information and one or more invisible token columns for token information; obtaining the user's role from the command; identifying a record in the table based on a combination of the identification information and the token information corresponding to the user's role; and performing the database operation on the identified record.

According to another embodiment of the present invention, there is provided a computer program product. The computer program product comprises a computer readable storage medium having program instructions embodied therewith, the program instructions executable by a processor to cause the processor to receive a command for performing a database operation with respect to a table of a database, wherein the table has a visible key column for identification information and one or more invisible token columns for token information; obtain the user's role from the command; identify a record in the table based on a combination of the identification information and the token information corresponding to the user's role; and perform the database operation on the identified record.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 2 shows an exemplary table which utilizes the computer-implemented method for access control for database according to an embodiment of the present invention;

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure.

Figure 1:
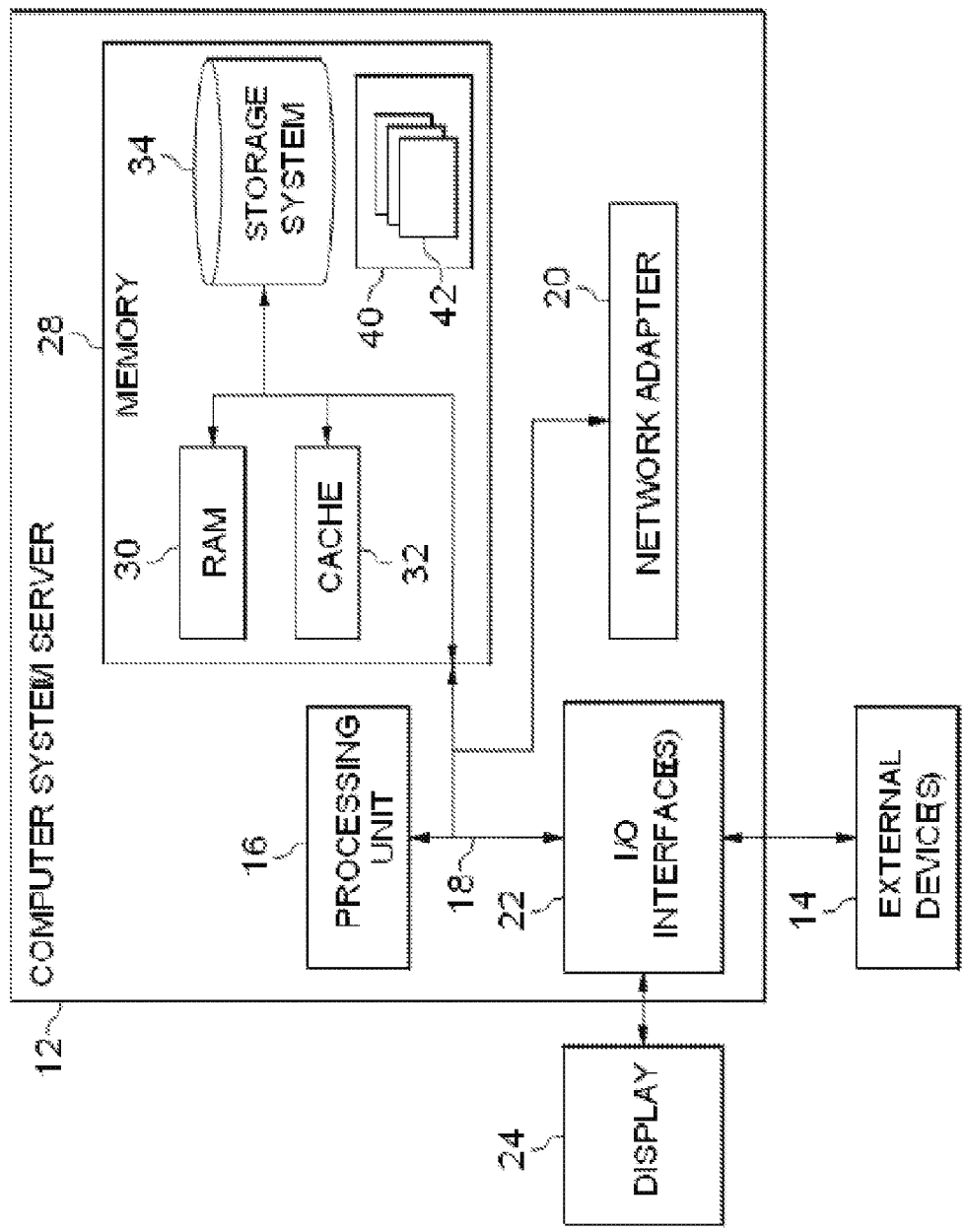
FIG. 1 shows an exemplary computer system which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Now the embodiments of the present invention will be described in detail in conjunction with the drawings.

As described above, in the traditional table, every record is identified by the primary key. With the same primary key, the user may access the same record, no matter what the user's role is.

In an embodiment of the present invention, the table is added with one or more token columns of token information, in addition to the key column of identification information. A person skilled in the art will know that the table must have one or more other columns of data. In such a table, the record is identified based on a combination of the identification information and the token information. Compared with the existing table in which the identification information identifies the record uniquely, in this embodiment, such a combination forms the unique identifier of the record. It makes it possible that the records with the same identification information can be existed concurrently, as long as the token information of these records is different.

As described above, the identification information is defined as information that can identify a record, such as the primary key. The key column of identification information can be visible for any user or application. In the embodiment, the token information is defined as information that can control the access of a record. The token information can be implicit and invisible for the user.

The token information can include authorization information. The authorization information can represent the role of the user that can access the record. For example, the authorization information of "SYSADM" means that a system administrator can access the record, the authorization information of "SYSOPR" means that a system operator can access the record, the authorization information of "PUBLIC" means that any user can access the record, and etc. Each user can be assigned with the role according to the user's identity and/or responsibility. In an embodiment, the user's role is one of a plurality of security groups for record access control. The security group corresponds to a kind of role and can contain the names of users which can be assigned with this kind of role.

Optionally the token information can also include time cycle. The time cycle is defined to indicate the life period of the record and can be represented by time period between start time and end time. In the embodiment, the start time can be set to creation time of the record or modification time of the records or current date, and the end time can be determined based on a data operation command received from the user or be set to a default value.

A person skilled in the art will appreciate that the token information may also include other information as required.

The table can comprise a plurality of records having the same value under the key column of identification information, i.e. there are multiple records having the same identification information in the table. In this case, the plurality of records will have different token information. If the token information comprises the time cycle, for the records with the same identification information, the time cycle will not be overlapped.

For the records with the same identification information, the value under the same column of data can be different for different authorization information and/or different time cycles. Thus the users with different role may obtain the different records at the same time, or the users with the same role may obtain the different records at different time, although these different records have the same identification information.

With the present embodiment, the access control for the database can be implemented at the table, which effectively eliminates the insecurity during the communication of the records between the table and an application which accesses the table. It can easily controls the users with different roles to access different records even if the records have the same identification information, and also prevents some records from being accessed by the unauthorized users, thereby protecting the data security.

FIG. 2 shows an exemplary table which utilizes the computer-implemented method for access control for database according to an embodiment of the present invention. As shown in FIG. 2, the table is a policy table which stores policy data. The table has a key column "Policy_ID" which records the primary key used for identifying the record, a column "coverage" which records the policy data, a column "Life_start" which records the start time of the record, a column "Life_end" which records the end time of the record, and a column "Authorization" which records the authorization information that can access the record. The key column "Policy_ID" and the column "coverage" are visible columns for the user. The columns "Life_start", "Life_end", and "Authorization" are the token columns and invisible for the user. Each record of the table can be identified based on the combination of the values under the columns "Policy_ID", "Life_start", "Life_end", and "Authorization".

The table as shown in FIG. 2 can be defined using Data Definition Language (DDL), which is known to a person skilled in the art. For example, the following DDL statements are used to define the table:

```
CREATE TABLE policy_info
    (Policy_ID      CHAR(4) NOT NULL,
    Coverage        INT NOT NULL,
    Life_start      DATE NOT NULL with default CURRENT DATE,
    Life_end        DATE NOT NULL with default '9999-12-31',
    PERIOD          BUSINESS_TIME (life_start, life_end),
    Authorization   CHAR(8) with default 'PUBLIC');
CREATE UNIQUE INDEX ix_policy
ON policy_info (Policy_ID, Authorization, PERIOD WITHOUT OVERLAPS)
```

Figure 3:
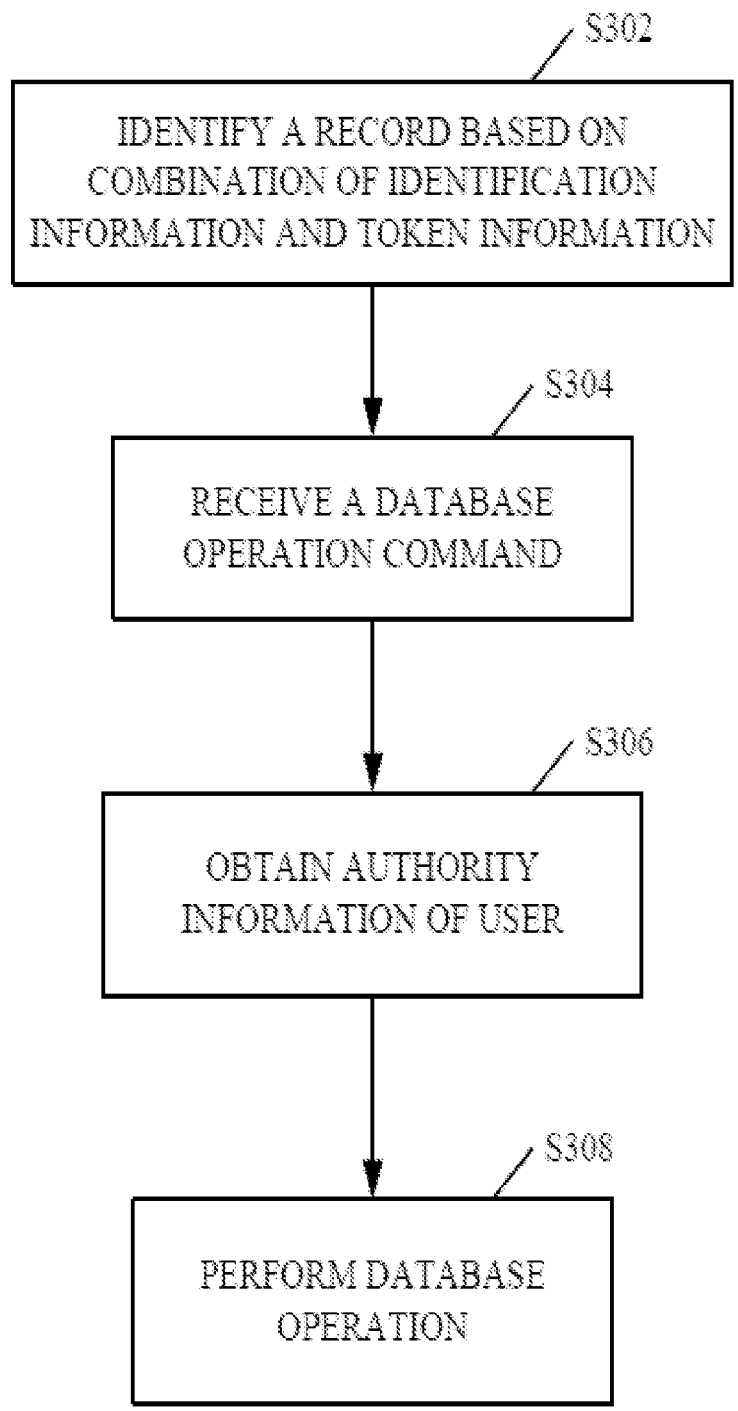
FIG. 3 is a schematic flowchart of the computer-implemented method for access control for database according to another embodiment of the present invention.

FIG. 3 shows a schematic flowchart of the computer-implemented method for access control for database according to another embodiment of the present invention.

In this embodiment, upon the setup of the table which has the token column(s), the records of the table can be queried or modified according to a database operation command with respect to the table from the user.

In the table, each record is identified based on the combination of the identification information and the token information such as the authorization information and the time cycle (step S302), as described above.

At step S304, the database operation command is received from the user. As known, the database operation command can be a record insertion command, a record deletion command, a record update command, or a record selection (or query) command. The database operation command can be implemented using Data Manipulation Language (DML). In the embodiment, the database operation command can comprise a name of the database operation, a name of the table to be operated, the identification information of the record to be operated, and authorization information of the user and/or the time of the database operation.

In response to the received database operation command, the user's role is obtained, at step S306. In the embodiment, the user's role indicates the authorization of the user to access the table. The user's role can be obtained from the received database operation command.

Then at step S308, the database operation indicated in the database operation command is performed based on the user's role, the identification information and the token information. In this step, firstly one or more records can be located based on the user's role, the identification information and the token information, and the located record can be referred to as "candidate record" hereinafter. Then the database operation is performed on the candidate record(s).

Next some examples about the database operation with respect to the table having the token column(s) will be given and described in detail.

Figure 4:
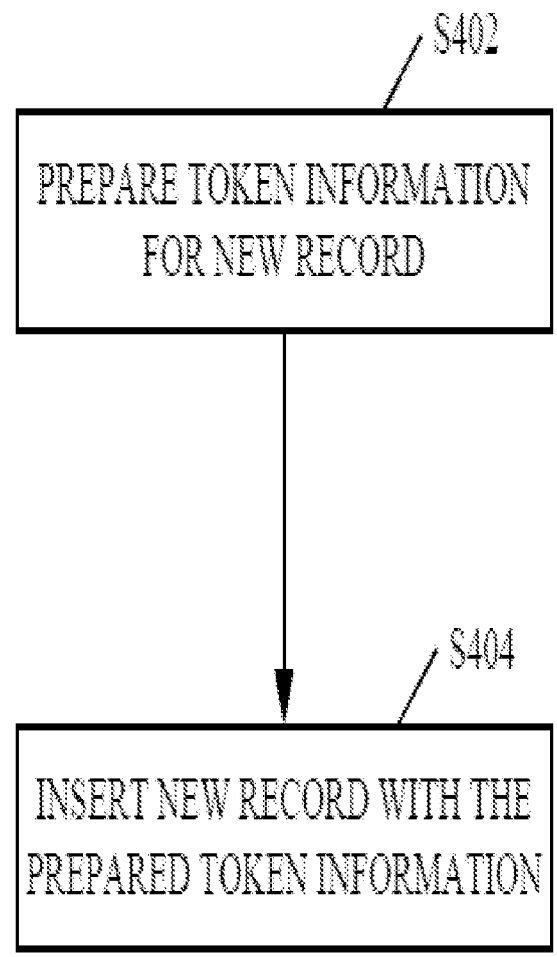
FIG. 4 is a schematic flowchart of performing the database operation being a record insertion operation in the table as shown in FIG. 2.

FIG. 4 illustrates a flowchart of performing the database operation being a record insertion operation in the table as shown in FIG. 2. In the table as shown in FIG. 2, the token information includes the authorization information "Authorization" and the time cycle which is represented by the start time "Life_start" and the end time "Life_end".

When the user wants to insert a new record into the table, he/she will issue a record insertion command, which can include the name of table into which the new record will be inserted, the identification information of the new record, the data to be inserted, and the authorization information for the new record. Additionally, the record insertion command can also comprise the start time and end time of the new record.

In response to receiving the record insertion command, at step S402, the token information is prepared for the new record. The token information for the new record can be obtained from the record insertion command. If no start time and end time are included in the record insertion command, the start time of the new record could be set to the current date and the end time could be set to the default value.

Then at step S404, the new record is inserted into the table with the prepared token information for the new record placed in the one or more token columns. In the process of the record insertion, the authorization information of the user will be obtained and checked to verify whether the user is authorized to access the table. If the user is not authorized to access the table, the record insertion will be rejected and the user will be notified with the rejection and the reason. Moreover the new record should satisfy all record constraints of the table, such as the maximum value for the columns or the minimum length for the columns. If the new record does not satisfy any record constraint, the record insertion will be rejected and the user will be notified with the rejection and the reason.

The following is an example of the record insertion operation, in which the record insertion command employs the DML statement "INSERT":

INSERT INTO policy_info (Policy_ID, Coverage, Authorization)
VALUES ('A123', 12000, 'SYSADM')

This command indicates that a new record is inserted into the table "policy_info" with "Policy_ID" as "A123", "Coverage" as "12000" and "Authorization" as "SYSADM". Assume that the current date is Jun. 1, 2014.

Upon receipt of the record insertion command as above, the token information for the new record can be prepared based on the received command. The authorization information is "SYSADM", the start time is set to "2014-06-01", and the end time is set to the default value "9999-12-31".

Then the new record is inserted into the table as follows:

| Policy_ID | Coverage | Life_start | Life_end | Authorization |
|---|---|---|---|---|
| A123 | 12000 | 2014-06-01 | 9999-12-31 | SYSADM |

Further, another new record with the same Policy_ID and time cycle but different authorization information can be inserted into the same table "policy_info".

For example, the record insertion command is as follows:
INSERT INTO policy_info (Policy_ID, Coverage, Authorization)
VALUES ('A123', 14000, 'SYSOPR')
This command indicates that a new record is inserted into the table "policy_info" with "Policy_ID" as "A123", "Coverage" as "14000", and "Authorization" as "SYSOPR".

Therefore, the new record can be inserted into the table as follows:

| Policy_ID | Coverage | Life_start | Life_end | Authorization |
|---|---|---|---|---|
| A123 | 12000 | 2014-06-01 | 9999-12-31 | SYSADM |
| A123 | 14000 | 2014-06-01 | 9999-12-31 | SYSOPR |

It can be seen that multiple records with the same identification information can be stored in the same table along with different authorization information or different time cycles.

Figure 5:
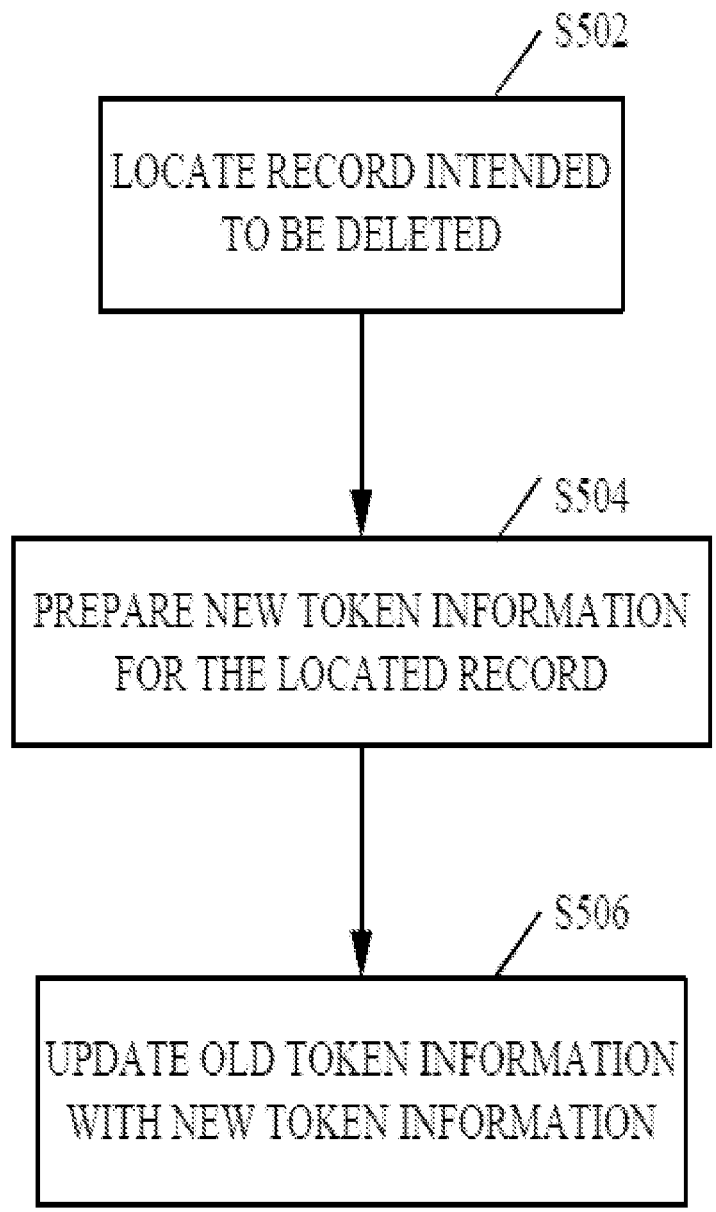
FIG. 5 is a schematic flowchart of performing the database operation being a record deletion operation in the table as shown in FIG. 2.

FIG. 5 shows a schematic flowchart of performing the database operation being a record deletion operation in the table as shown in FIG. 2. When the user wants to delete a record from the table, he/she will issue a record deletion command. The record deletion command can comprise the name of the table from which a record to be deleted, the identification information of the record to be deleted, and the authorization information for the record to be deleted. Optionally, the record deletion command can comprise the time cycle of the record to be deleted.

Referring to FIG. 5, at step S502, in response to receiving the record deletion command from the user, the record to be deleted (which is also referred to as "candidate record") is located. The candidate record can be located based on the identification information of the record, the authorization information for the record, and, if any, the time cycle of the record. If no candidate record is located, the record deletion operation will be rejected, and the user will be notified with the rejection and the reason.

Then at step S504, new token information for the located record is prepared based on the database operation and the old token information of the located record. After the candidate record is located, the time cycle of the candidate record can be obtained, and the authorization information of the user can also be obtained. Then it is checked whether the user is authorized to delete the record. If the user is authorized to delete the record, the new end time of the record can be determined to be the time of the record deletion, i.e. the current date. If the user is not authorized to delete the record, the record deletion operation will be rejected, and the user will be notified with the rejection and the reason.

At step S506, the old token information is updated with the new token information. According to one embodiment of the invention, the record deletion operation does not physically delete the record from the table, but simply change the end time of the record, which causes the record invalid.

The following is an example for the record deletion operation, in which the record deletion command employs the DML statement "DELETE":
DELETE policy_info
WHERE Policy_ID='A123'
With Authorization "SYSADM"
This record deletion command indicates the deletion of the record with "Policy_ID" as "A123" and "Authorization" as "SYSADM" from the table "policy_info".

Assume the current date is Jul. 10, 2015 and the current table "policy_info" is as follows:

| Policy_ID | Coverage | Life_start | Life_end | Authorization |
|---|---|---|---|---|
| A123 | 12000 | 2014-06-01 | 9999-12-31 | SYSADM |
| A123 | 14000 | 2014-06-01 | 9999-12-31 | SYSOPR |

Upon receipt of the above record deletion command, the record to be deleted is located, i.e. the first record in the above table. Then the new end time of this record is determined to be "2015-07-10", and the old end time of the record "9999-12-31" is updated with the new end time. The table after the record deletion operation is as follows:

| Policy_ID | Coverage | Life_start | Life_end | Authorization |
|---|---|---|---|---|
| A123 | 12000 | 2014-06-01 | 2015-07-10 | SYSADM |
| A123 | 14000 | 2014-06-01 | 9999-12-31 | SYSOPR |

According to another embodiment of the present invention, deletion of the record may be implemented by physically removing the record.

Figure 6:
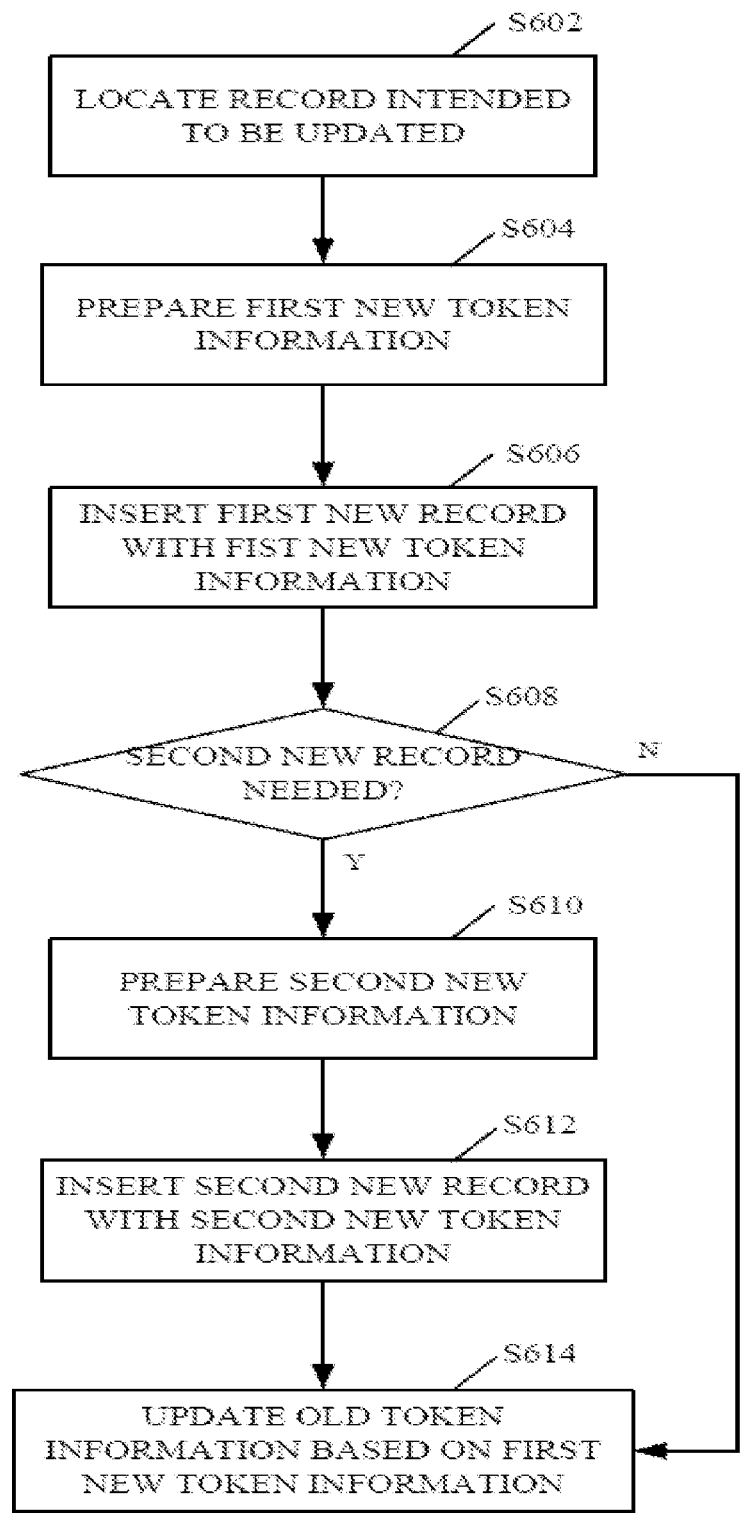
FIG. 6 is a schematic flowchart of performing the database operation being a record update operation in the table as shown in FIG. 2.

FIG. 6 shows a schematic flowchart of performing the database operation being a record update operation in the table as shown in FIG. 2. When the user wants to update a record, he/she will issue a record update command. The record update command can comprise the name of the table, the identification information of the record to be updated, the data to be updated, the authorization information for the record to be updated, and/or new time cycle for the data to be updated. Additionally, the record update command can comprise the time cycle of the record to be updated.

In response to receiving the record update command from the user, at step S602, the record to be updated (which is also referred to as "candidate record") is located. The candidate record can be located depending on the identification information of the record, the authorization information for the record, and, if any, the time cycle of the record. After locating the candidate record, the token information of the candidate record (which is referred to as "old token information") can be obtained. If no candidate record is located, the record update operation will be rejected, and the user will be notified with the rejection and the reason.

Then at step S604, first new token information is prepared based on the database operation. In the first new token information, the authorization information is same as the authorization information included in the record update command. In the case that the record update command comprises the new time cycle, the start time will be determined to be the start time of the new time cycle, and the end time is determined to be the end time of the new time cycle. In the case that the record update command does not comprise the new time cycle, the start time will be determined to be the current date and the end time is determined to be the end time of the old time cycle of the old token information.

At step S606, a first new record is inserted into the table with the first new token information placed in the one or more token columns.

Then at step S608, it is determined whether a second new record is needed based on the first new token information and old token information. In the embodiment, it is determined whether the end time of the time cycle of the first new token information is equal to the end time of the old time cycle of the old token information. If it is determined that the end times are not equal, it is determined that the second new record is needed. If it is determined that the end times are equal, it is determined that no new record is needed.

If it is determined that the second new record is needed, at step S610, second new token information is prepared based on the old token information and the first new token information. In the embodiment, the time cycle of the second new token information will be recalculated based on the time cycle of the first token information and the time cycle of the old token information. In the second new token information, the start time of the time cycle is determined based on the end time of the time cycle of the first new token information, and the end time of the time cycle is determined to be the end time of the old time cycle of the old token information.

Then at step S612, the second new record is inserted into the table with the second new token information placed in the one or more token columns.

At step S614, the old token information is updated based on the first new token information. In this step, the end time of the old time cycle of the old token information will be updated based on the start time of the time cycle of the first new token information.

The following is an example for the record update operation, in which the record update command employs the DML statement "UPDATE":

UPDATE policy_info
SET coverage=15000
WHERE policy_ID='A123'
FOR AUTHORIZATION "SYSADM"

This record update command indicates updating the record with "Policy_ID" as "A123" and "Authorization" as "SYSADM" in the table "policy_info" to set "coverage" to "15000".

Assume the current date is Jul. 10, 2015 and the current table "policy_info" is as follows:

| Policy_ID | Coverage | Life_start | Life_end | Authorization |
|---|---|---|---|---|
| A123 | 12000 | 2014-06-01 | 9999-12-31 | SYSADM |
| A123 | 14000 | 2014-06-01 | 9999-12-31 | SYSOPR |

Upon receipt of the above record update command, the record to be updated is located, i.e. the first record in the above table. The time cycle of the first record is from "2014-06-01" to "9999-12-31". Then the start time of the time cycle of the new token information can be determined as "2015-07-10", and the end time of the time cycle of the new token information can be determined as "9999-12-31". The new record is inserted into the table as follows:

| Policy_ID | Coverage | Life_start | Life_end | Authorization |
|---|---|---|---|---|
| A123 | 12000 | 2014-06-01 | 9999-12-31 | SYSADM |
| A123 | 15000 | 2015-07-10 | 9999-12-31 | SYSADM |
| A123 | 14000 | 2014-06-01 | 9999-12-31 | SYSOPR |

As the end time of the new token information is equal to the end time of the old token information, no more new record is needed. Then the end time of the first record is updated based on the end time of the new token information. That is, the end time of the first record is updated as "2015-07-09", shown as follows:

| Policy_ID | Coverage | Life_start | Life_end | Authorization |
|---|---|---|---|---|
| A123 | 12000 | 2014-06-01 | 2015-07-09 | SYSADM |
| A123 | 15000 | 2015-07-10 | 9999-12-31 | SYSADM |
| A123 | 14000 | 2014-06-01 | 9999-12-31 | SYSOPR |

The following is another example for the record update operation. The record update command is defined as follows:

UPDATE policy_info
SET coverage=13000
WHERE policy_id='A123'
[With AUTHORIZATION_TIME FROM 2014-12-23 TO 2015-12-23]
FOR AUTHORIZATION "SYSADM" This record update command indicates updating the record with "Policy_ID" as "A123" and "Authorization" as "SYSADM" in the table "policy_info" to set "coverage" to "13000" from "2014-12-23" to "2015-12-23".

Assume the current table "policy_info" is as follows:

| Policy_ID | Coverage | Life_start | Life_end | Authorization |
|---|---|---|---|---|
| A123 | 12000 | 2014-06-01 | 9999-12-31 | SYSADM |
| A123 | 14000 | 2014-06-01 | 9999-12-31 | SYSOPR |

Upon receipt of the above record update command, the record to be updated can be located, i.e. the first record in the above table. The time cycle of the first record is from "2014-06-01" to "9999-12-31". Then the start time of the time cycle of the new token information can be determined as "2014-12-23", and the end time of the time cycle of the new token information can be determined as "2015-12-23". The new record is inserted into the table as follows:

| Policy_ID | Coverage | Life_start | Life_end | Authorization |
|---|---|---|---|---|
| A123 | 12000 | 2014-06-01 | 9999-12-31 | SYSADM |
| A123 | 13000 | 2014-12-23 | 2015-12-23 | SYSADM |
| A123 | 14000 | 2014-06-01 | 9999-12-31 | SYSOPR |

As the end time of the new token information is not equal to the end time of the old token information, second new record is needed. Then the start time of the second new token information can be determined as "2015-12-24", and the end time of second new token information can be determined as "9999-12-31". The second new record is inserted into the table as follows:

| Policy_ID | Coverage | Life_start | Life_end | Authorization |
|---|---|---|---|---|
| A123 | 12000 | 2014-06-01 | 9999-12-31 | SYSADM |
| A123 | 13000 | 2014-12-23 | 2015-12-23 | SYSADM |
| A123 | 12000 | 2015-12-24 | 9999-12-31 | SYSADM |
| A123 | 14000 | 2014-06-01 | 9999-12-31 | SYSOPR |

Then the end time of the first record is updated based on the end time of the new token information. That is, the end time of the first record is updated as "2015-12-22", shown as follows:

| Policy_ID | Coverage | Life_start | Life_end | Authorization |
|---|---|---|---|---|
| A123 | 12000 | 2014-06-01 | 2014-12-22 | SYSADM |
| A123 | 13000 | 2014-12-23 | 2015-12-23 | SYSADM |
| A123 | 12000 | 2015-12-24 | 9999-12-31 | SYSADM |
| A123 | 14000 | 2014-06-01 | 9999-12-31 | SYSOPR |

Next the process of performing the database operation being a record selection operation in the table as shown in FIG. 2 will be described. When the user wants to select a record from the table, he/she will issue a record selection command. The record selection command can comprise the name of the table from which a record is to be selected, and at least one of the time information for selection, the authorization information for the record to be selected and the identification information of the record to be selected.

Upon receipt of the record selection command, the record selection command is analyzed with predicate information. Then the authorization information of the user can be obtained. The records can be filtered from the table based on the token information and the record selection command, as the candidate records. If no candidate record is filtered, the record selection operation will be rejected and the user will be notified with the rejection and the reason.

The following is an example for the record selection operation, in which the record selection command employs the DML statement "SELECT":

```
SELECT policy_ID, Coverage FROM policy_info
[With AUTHORIZATION_TIME 2014-06-30]
[With AUTHORIZATION 'SYSADM']
```

This record selection command indicates selecting the record(s) with "Authorization" as "SYSADM" and "AUTHORIZATION_TIME" as "2014-06-30" in the table "policy_info".

Assume the current table "policy_info" is as follows:

| Policy_ID | Coverage | Life_start | Life_end | Authorization |
|---|---|---|---|---|
| A123 | 12000 | 2014-06-01 | 2015-07-09 | SYSADM |
| A123 | 15000 | 2015-07-10 | 9999-12-31 | SYSADM |
| A123 | 14000 | 2014-06-01 | 9999-12-31 | SYSOPR |

Upon receipt of the above record selection command, the authorization information for the record to be selected and the time information can be obtained. Based on the obtained token information, the record can be filtered from the table, shown as follows, wherein the token columns are invisible for the user:

| Policy_ID | Coverage |
|---|---|
| A123 | 12000 |

The present invention may be a system, a method, and/or a computer program product. The computer program product may include a computer readable storage repository (or media) having computer readable program instructions thereon for causing a processor to carry out aspects of the present invention.

The computer readable storage repository can be a tangible device that can retain and store instructions for use by an instruction execution device. The computer readable storage repository may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage repository includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage repository or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage repository within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and traditional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage repository that can direct a computer, a programmable data processing apparatus, and/or other devices to function in a particular manner, such that the computer readable storage repository having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving a command for performing a database operation with respect to a table of a database, wherein the table has a visible key column for identification information and one or more invisible token columns for token information;
    obtaining the user's role from the command;
    identifying a record in the table based on a combination of the identification information and the token information corresponding to the user's role; and
    performing the database operation on the identified record, wherein the database operation comprises:
        updating a record in the table, and wherein performing the database operation on the identified record comprises:
        retrieving old token information of the record;
        preparing first new token information based on the command;
        inserting a first new record with the first new token information placed in the one or more token columns;
        preparing second new token information based on the old token information and the first new token information;
        inserting a second new record with the second new token information placed in the one or more token columns; and
        updating the old token information with the first new token information.

2. The method according to claim 1, wherein the token information includes at least one of authorization information and time cycle.

3. The method according to claim 2, wherein the user's role is one of a plurality of security groups for record access control.

4. The method according to claim 1, wherein the table comprises a plurality of records having the same value under the visible key column but having different value under the one or more taken column.

5. The method according to claim 1, wherein the database operation comprises:
    inserting a record into the table, and wherein performing the database operation on the identified record comprises:
    preparing token information for the record; and
    inserting the record with the token information placed in the one or more token columns.

6. The method according to claim 1, wherein the database operation comprises:
    deleting a record in the table, and wherein performing the database operation on the identified record comprises:
    preparing new token information based on the command and old token information of the identified; and
    updating the old token information with the new token information.

7. The method according to claim 1, wherein the database operation comprises selecting a record in the table, and wherein performing the database operation on the identified record further comprises:
    filtering candidate records based on their token information.

8. A system, wherein a table of a database has a visible key column for identification information and one or more token columns for token information, the system comprising:
    one or more processors;
    a memory coupled to at least one of the processors;

a set of computer program instructions stored in the memory and executed by at least one of the processors in order to perform actions of:
receiving a command for performing a database operation with respect to a table of a database, wherein the table has a visible key column for identification information and one or more invisible token columns for token information;
obtaining the user's role from the command;
identifying a record in the table based on a combination of the identification information and the token information corresponding to the user's role; and
performing the database operation on the identified record, wherein the database operation comprises updating a record in the table, and wherein the set of computer program instructions when executed further perform actions of:
retrieving old token information of the record;
preparing first new token information based on the command;
inserting a first new record with the first new token information placed in the one or more token columns;
preparing second new token information based on the old token information and the first new token information;
inserting a second new record with the second new token information placed in the one or more token columns; and
updating the old token information with the first new token information.

9. The system according to claim 8, wherein the database operation comprises inserting a record into the table, and the set of computer program instructions when executed further perform actions of:
preparing token information for the record; and
inserting the record with the token information placed in the one or more token columns.

10. The system according to claim 8, wherein the database operation comprises deleting a record in the table, and wherein the set of computer program instructions when executed further perform actions of:
preparing new token information based on the command and old token information of the identified; and
updating the old token information with the new token information.

11. The system according to claim 8, wherein the database operation comprises selecting a record in the table, and wherein the set of computer program instructions when executed further perform actions of:
filtering candidate records based on their token information.

12. The system according to claim 8, wherein the token information includes at least one of authorization information and time cycle.

13. A computer program, wherein a table has a visible key column for identification information and one or more token columns for token information, the computer program comprising a computer readable storage medium having program instructions embodied therewith, the program instructions executable by a processor to cause the processor to:
receive a command for performing a database operation with respect to a table of a database, wherein the table has a visible key column for identification information and one or more invisible token columns for token information;
obtain the user's role from the command;
identify a record in the table based on a combination of the identification information and the token information corresponding to the user's role; and
perform the database operation on the identified record, wherein the database operation comprises updating a record in the table, and wherein the program instructions executable by the processor cause the processor to:
retrieve old token information of the record;
prepare first new token information based on the command;
insert a first new record with the first new token information placed in the one or more token columns;
prepare second new token information based on the old token information and the first new token information;
insert a second new record with the second new token information placed in the one or more token columns; and
update the old token information with the first new token information.

14. The computer program according to claim 13, wherein the database operation comprises inserting a record into the table, and wherein the program instructions executable by the processor cause the processor to:
prepare token information for the record; and
insert the record with the token information placed in the one or more token columns.

15. The computer program according to claim 13, wherein the database operation comprises deleting a record in the table, and wherein the program instructions executable by the processor cause the processor to:
prepare new token information based on the command and old token information of the identified; and
update the old token information with the new token information.

16. The computer program according to claim 13, wherein the database operation comprises selecting a record in the table, and wherein the program instructions executable by the processor cause the processor to:
filter candidate records based on their token information.

17. The computer program product of claim 13, wherein the token information includes at least one of authorization information and time cycle.

* * * * *